United States Patent
Berti et al.

(10) Patent No.: US 7,258,205 B2
(45) Date of Patent: Aug. 21, 2007

(54) BLADE STOP COMPONENTS AND ROLLER BEARING CLUTCH DESIGN FOR A POWER TOOL

(75) Inventors: Jerome L. Berti, DeQueen, AR (US); Terry E. Fear, DeQueen, AR (US); James R. Higgins, Jr., Locksburge, AR (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 0 days.

(21) Appl. No.: 10/850,141

(22) Filed: May 20, 2004

(65) Prior Publication Data

US 2005/0257379 A1    Nov. 24, 2005

(51) Int. Cl.
*B60T 1/00* (2006.01)
(52) U.S. Cl. .......................... 188/31; 188/265; 74/529; 74/537
(58) Field of Classification Search ............... 30/277.4, 30/276, 282; 188/31, 2 D, 69, 265; 74/527, 74/529, 537, 538
See application file for complete search history.

(56) References Cited

U.S. PATENT DOCUMENTS

| | | | | |
|---|---|---|---|---|
| 3,361,165 | A | * | 1/1968 | Irgens .......................... 30/381 |
| 4,148,173 | A | * | 4/1979 | Hoff ............................. 56/11.3 |
| 4,875,384 | A | * | 10/1989 | Hirayama et al. ......... 74/500.5 |
| 4,898,039 | A | * | 2/1990 | Aiyama et al. .................. 74/6 |
| 5,150,523 | A | | 9/1992 | McCurry |
| 5,155,914 | A | | 10/1992 | Ohkanda |
| 5,305,528 | A | | 4/1994 | Garrison |
| 5,531,027 | A | | 7/1996 | Martinez et al. |
| 5,653,030 | A | | 8/1997 | Yokoyama et al. |
| 5,689,887 | A | | 11/1997 | Heywood et al. |
| 5,718,052 | A | * | 2/1998 | Taomo et al. ................. 30/276 |
| 5,720,371 | A | | 2/1998 | Kimura et al. |
| 5,806,191 | A | | 9/1998 | Yokoyama et al. |
| 5,947,866 | A | | 9/1999 | Nagashima |
| 6,021,757 | A | | 2/2000 | Nagashima |
| 6,094,822 | A | | 8/2000 | Lange et al. |
| 6,105,258 | A | | 8/2000 | Akaike |
| 6,108,867 | A | * | 8/2000 | Nagashima ................. 16/110.1 |
| 6,129,189 | A | | 10/2000 | Kerr |
| 6,167,973 | B1 | | 1/2001 | Nagashima |
| 6,170,159 | B1 | | 1/2001 | Kramer et al. |
| 6,454,245 | B2 | * | 9/2002 | Kobayashi .................... 261/52 |
| 6,598,299 | B2 | | 7/2003 | Stark et al. |
| 6,640,444 | B1 | | 11/2003 | Harada et al. |

FOREIGN PATENT DOCUMENTS

| | | |
|---|---|---|
| DE | 40 05 133 A1 | 8/1991 |
| DE | 4101705 A1 * | 3/1992 |
| DE | 44 18 102 A1 | 12/1995 |
| DE | 44 21 746 A1 | 1/1996 |

* cited by examiner

*Primary Examiner*—Devon Kramer
(74) *Attorney, Agent, or Firm*—Pearne & Gordon LLP

(57) ABSTRACT

A power tool includes a braking system that minimizes a stopping time for a cutting blade of the power tool. The braking system includes a roller bearing clutch mechanism combined with a positive stop pin. The stop pin is provided at an end portion of a cable assembly. The cable assembly is coupled to a trigger through a lever on one end, with the stop pin and a return spring inserted into a gear box on the other end. When the trigger is in a released position, the stop pin fully engages into a positive stop on a bearing cage at a top portion of the drive assembly. The coiled return spring keeps the stop pin in position. When the trigger is pulled, the cable pulls the stop pin out of the positive stop.

16 Claims, 4 Drawing Sheets

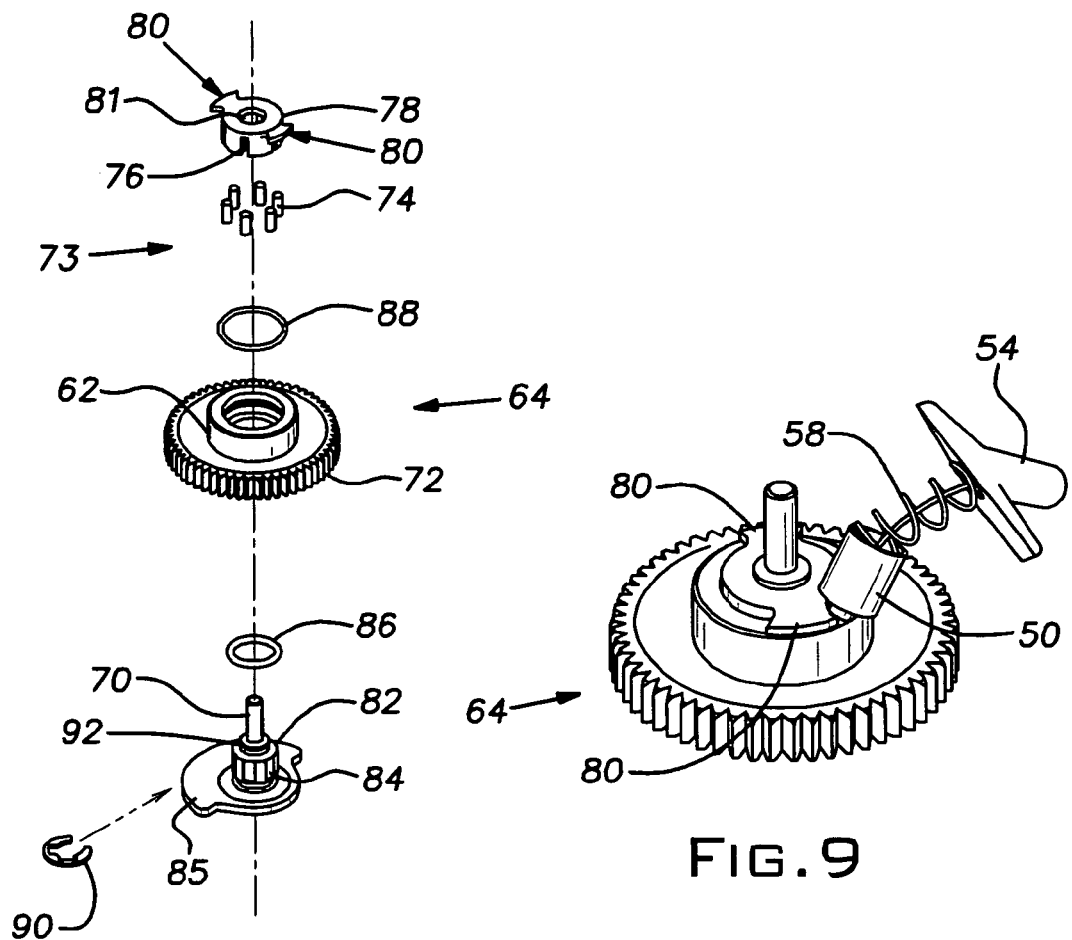
FIG. 7
FIG. 9
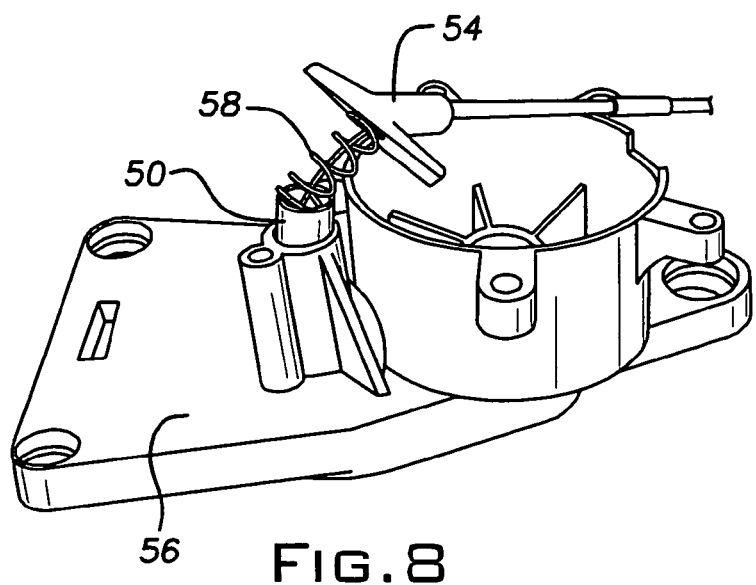
FIG. 8

BLADE STOP COMPONENTS AND ROLLER BEARING CLUTCH DESIGN FOR A POWER TOOL

FIELD OF THE INVENTION

The present invention relates to power tools and more particularly, to a braking device for a power tool, such as a hedge trimmer.

BACKGROUND OF THE INVENTION

A portable trimmer, such as a shoulder-type portable trimmer, a backpack-type portable trimmer, a hedge trimmer or the like, generally employs a driving mechanism which transmits the power generated by an internal combustion engine to a cutter through a centrifugal clutch. In these portable trimmers, a brake device typically includes a friction member, such as a brake shoe or a brake band, which slidably engages with a clutch drum of the centrifugal clutch to prevent a cutter from free rotation. In operation, when an operator grips a brake lever, the brake device is actuated to stop rotation of the clutch drum and the cutter is prevented from being rotated unexpectedly. After having released the brake lever and thereby de-activating the brake device, the operator holds a throttle lever, adjusts a throttle opening of a throttle valve to control the power from the internal combustion engine, and thereby drives the cutter through the clutch drum to perform trimming work.

In this type of trimmer, however, if the brake device is released while the throttle lever is being gripped, the cutter might suddenly start to rotate at high speed before the safety at surrounding work operations is confirmed and might possibly cause a serious accident.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with an aspect of the present invention, a braking system for a power tool includes a roller bearing clutch mechanism provided within a drive assembly; and a stop pin which interacts with the roller bearing clutch mechanism to minimize a stopping time of a blade of the power tool. The stop pin engages the drive assembly via a throttle cable with a coiled return spring.

In according with another aspect of the present invention, a braking system for a power tool is provided. The braking system includes a drive assembly having a drive shaft, wherein the drive shaft is supported by bearings on only one end of the drive shaft. The braking system also includes a positive stop located at a top portion of the drive assembly; and a stop pin to engage the positive stop to minimize a blade stopping time of the power tool.

In accordance with yet another aspect of the present invention, a braking system for a power tool is provided. The braking system includes a drive assembly, which comprises a drive shaft; a counterweight secured to a bottom portion of the drive shaft; and a positive stop provided at a top portion of the drive shaft. The braking system further includes a stop pin that engages the positive stop to stop a cutting blade of the power tool.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 7 is an exploded view of the drive assembly of the hedge trimmer of FIG. 1;

FIG. 8 is a perspective view of the drive assembly and a stop pin of the hedge trimmer of FIG. 1, and illustrates that interaction therebetween; and FIG. 9 is a perspective view of the gear box and the stop pin of the hedge trimmer of FIG. 1, and illustrates that interaction therebetween.

DESCRIPTION OF AN EXAMPLE EMBODIMENT

Figure 1:
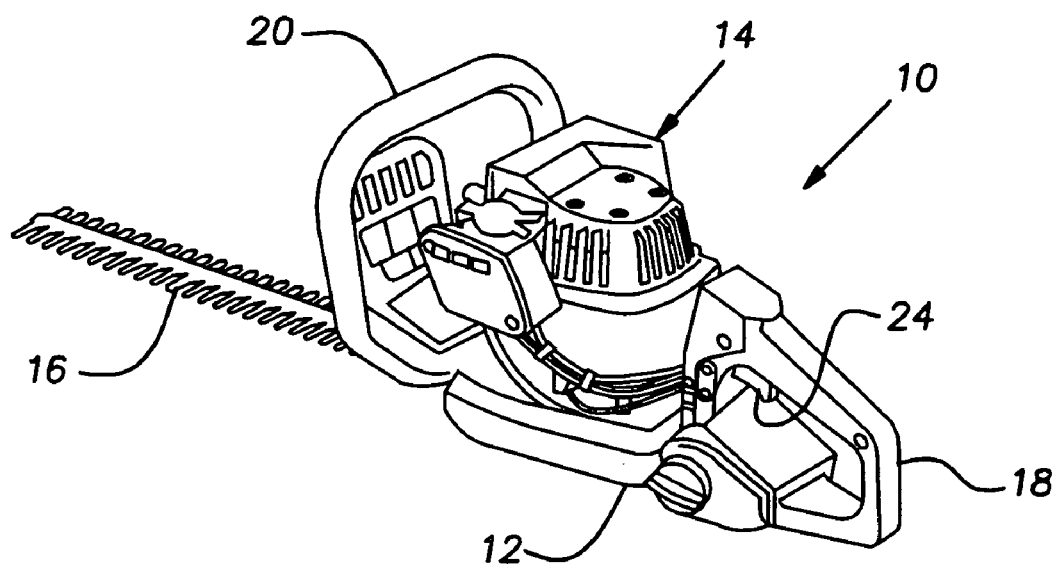
FIG. 1 is a perspective view of an example hedge trimmer in accordance with an aspect of the present invention.

Referring initially to FIG. 1, there is shown a perspective view of an example hedge trimmer 10 incorporating features of the present invention. Although the present invention will be described with reference to the embodiment shown in the drawings and for use in a hedge trimmer, it should be understood that the present invention could be incorporated into any suitable type of power tool or power equipment and is not limited to use merely in a hedge trimmer and, may be incorporated in different types of embodiments. In addition, any suitable size, shape or type of elements or materials could be used.

The hedge trimmer 10 generally comprises a frame 12, an engine 14 connected to the frame 12, and a cutting blade 16. The frame 12 can be made of metal and/or plastic and includes a rear handle section 18 and a front handle 20 section. The engine 14, in the embodiment shown, is an internal combustion engine. However, any other suitable motor (e.g., an electric motor) could also be provided. The engine 14 is fixedly connected to the frame 12. The trimmer 10 has a throttle device, attached to the frame 12, which has a throttle trigger 24 at the rear handle section 18, and a clutch (not shown) located in the frame 12 that connects the engine 14 to the cutting blade 16. The throttle trigger 24 is generally biased in a home position or low motor speed position via a trigger spring (not shown). The trigger spring is typically a coiled spring located in the rear handle section 18; however, any suitable means to bias the trigger 24 at its low motor speed position can be provided.

Figure 2:
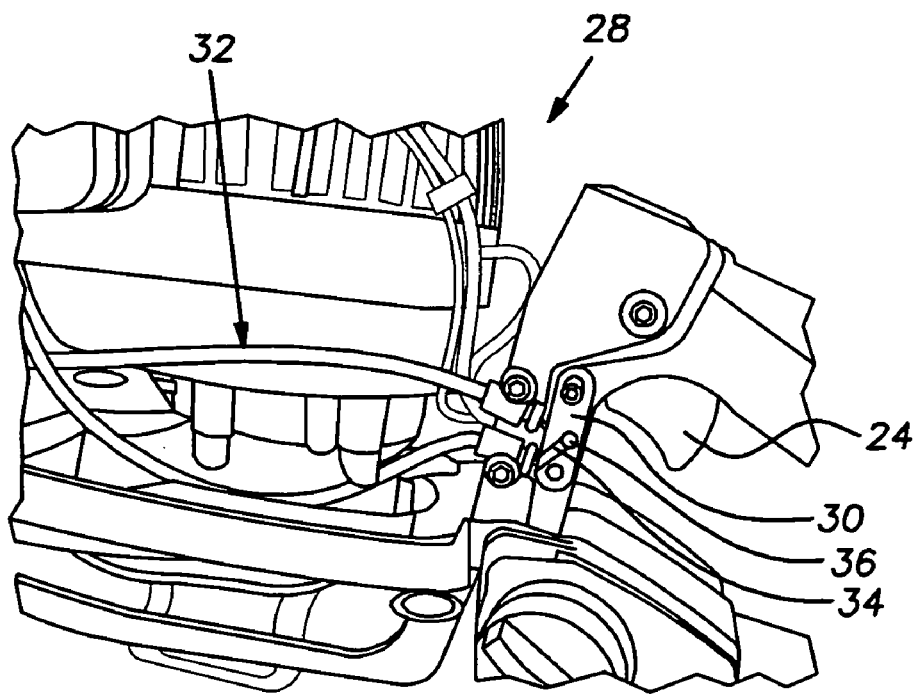
FIG. 2 is an enlarged front view of a braking system of the hedge trimmer of FIG. 1.

Turning now to FIG. 2, the hedge trimmer 10 includes an example braking system 28 in accordance with an aspect of the present invention. The braking system 28 comprises a throttle lever 30, which couples the throttle trigger 24 to a cable assembly 32. The throttle lever 30 includes a guide slot 34 through which a first end connector 36 of the cable assembly 32 can travel. The guide slot 34 is configured so that when the first end connector 36 travels within the guide slot 34, a pulling force on the cable assembly 32 can increase and/or decrease. The throttle trigger 24 is coupled to the first end connector 36 of the cable assembly 32 such that the throttle trigger 24 is operable to direct the first end connector 36 along the path of the guide slot 34. It is to be appreciated that any suitable means to provide a pulling force on the cable via operation of a trigger can be provided and need not be limited to the throttle lever configuration described herein.

Figure 3:
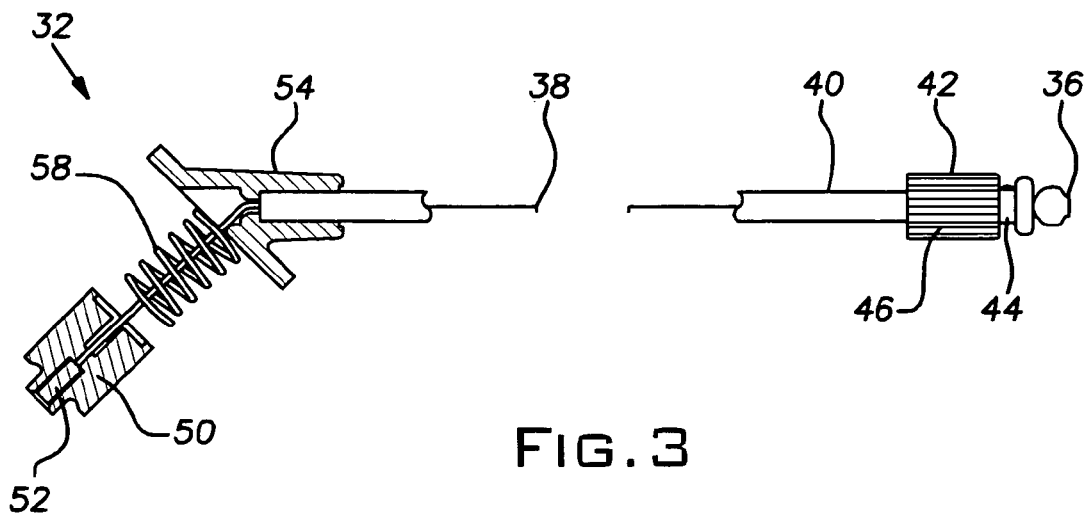
FIG. 3 is a schematized, exploded view of a cable assembly of the hedge trimmer of FIG. 1.
Figure 4:
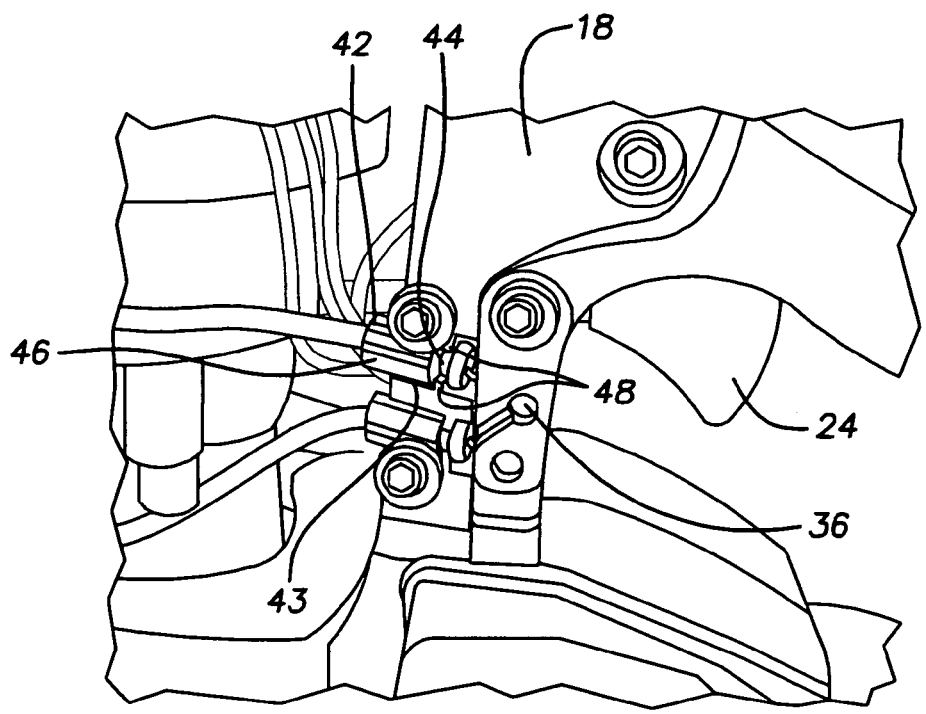
FIG. 4 is a further enlarged front view of a handle, a throttle lever, and the cable assembly of the hedge trimmer shown in FIG. 2.

FIG. 3 illustrates an example of the cable assembly 32 in accordance with an aspect of the present invention. The cable assembly 32 includes a flexible cable 38, such as a wire cable, and a cable housing 40, which can be hollow plastic tubing, to protect the cable 38. A first end portion of the flexible cable 38 is secured within the first end connector 36. Adjacent to the first end connector 36 of the cable assembly 32 is an end fitting 42. The end fitting 42 is operable to couple the cable assembly 32 to the rear handle section 18 of the trimmer 10, as depicted in FIG. 4. The rear handle section 18 includes a cable receiving portion 43 such that the end fitting 42 can be snap fit into the rear handle section 18. The end fitting 42 includes a neck 44 and a ribbed portion 46, which facilitates gripping of the end fitting 42. A diameter of the neck 44 corresponds with two projections 48 located in the cable receiving portion 43 to provide a secure coupling between the cable assembly 32 and the rear handle 18.

Figure 5:
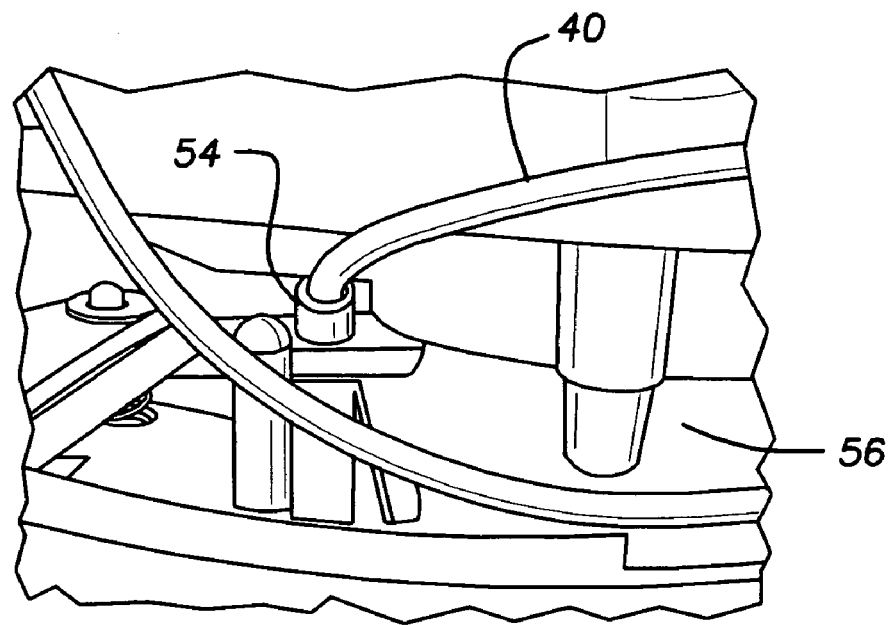
FIG. 5 is a further enlarged view of the cable assembly and a gear box shown in FIG. 2.

Turning back to FIG. 3, a stop pin 50, which is employed to minimize a blade stopping time of the trimmer 10, is located at a second end of the cable assembly 32. The stop pin 50 is configured to engage with a roller bearing clutch mechanism as will be explained in greater detail below. A second end connector 52 is provided within the stop pin 50 to secure a second end of the flexible cable 38. Provided at an end portion of the cable housing 40 is an anchor 54, which is operable to secure the cable assembly 32 to a top portion of a gearbox 56 of the trimmer 10, as illustrated in FIG. 5. A spring mechanism 58, such as a conventional coil spring, is provided between the stop pin 50 and the anchor 54 to bias the stop pin 50 away from the anchor 54.

Figure 6:
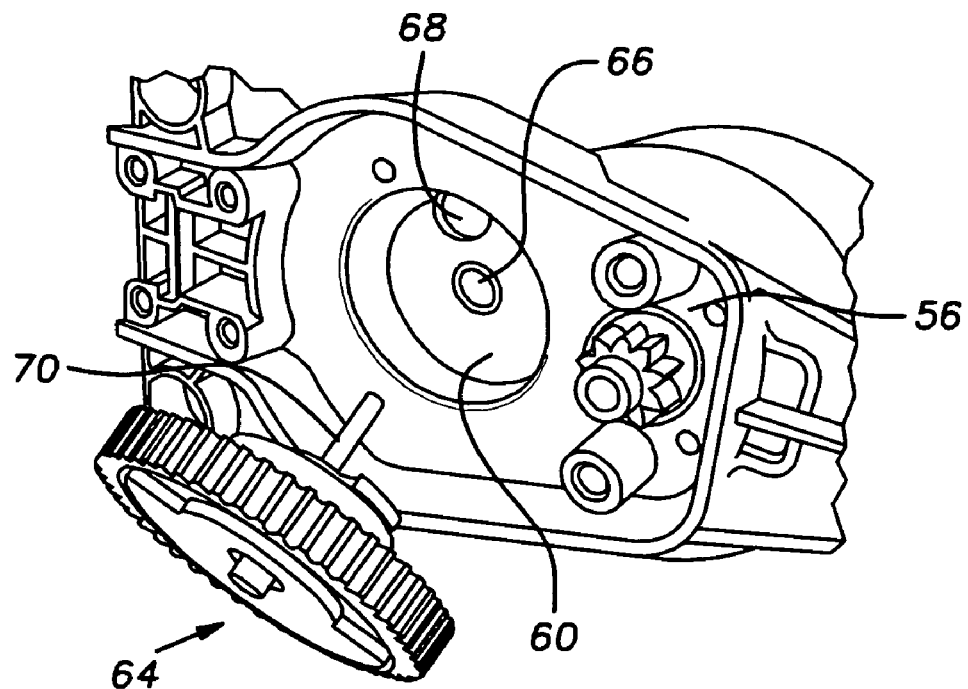
FIG. 6 is a perspective view of a partially disasembled gear box and drive assembly of the hedge trimmer of FIG. 1.

FIG. 6 depicts a bottom portion of the gear box 56 in accordance with an aspect of the present invention. The gear box 56 includes a recessed portion 60 adapted to receive an annular portion 62 of a drive assembly 64. The recessed portion 60 of the gear box 56 includes first and second apertures 66 and 68. The first aperture 66 is located at a center of the recessed portion 60 and is adapted to receive a drive shaft 70 of a drive assembly 64. The second aperture 68 is located at a periphery of the recessed portion 60 and is adapted to receive the stop pin 50 of the cable assembly 32.

Turning now to FIG. 7, an exploded view of the drive assembly 64 is shown. The drive assembly 64 includes a gear 72 having a plurality of gear teeth located about the periphery of the gear 72. The annular portion 62 is integrally formed with the gear 72 and projects from a top portion thereof. A roller bearing clutch mechanism 73 is positioned within the annular portion 62. An inner diameter of the annular portion 62 corresponds with an outer diameter of a bottom portion of a bearing cage 78 of the roller bearing clutch mechanism 73. The bearing cage 78 includes a plurality of bearing slots 76 located around a periphery of the bearing cage 78. The bearing slots 76 are configured to house a roller bearing 74 within each slot 76.

A top portion of the bearing cage 78 includes one or more positive stops 80. In this example, two positive stops 80 are provided. Further within this example, each positive stop 80 of the roller bearing clutch mechanism 73 is an arm projecting radially outwardly from a top portion of the bearing cage 78. The two arms are at opposing sides of the bearing cage 78. The arms project to an outer periphery of the annular portion 62. The arms are employed in combination with the stop pin 50 to minimize a blade stopping time for the hedge trimmer 10, as will be described in further detail below.

The drive shaft 70 projects through a central aperture 81 in the bearing cage 78. The aperture diameter of the bearing cage 78 corresponds with an outer diameter of a drive bushing 82 coupled to the drive shaft 70. The drive bushing 82 may be may of a durable material (e.g., a metal). The drive bushing 82 also includes bearing slots 84, which correspond with the bearing slots 76 in the bearing cage 78, to house the roller bearings 74. A counterweight 85 is secured to a bottom portion of the drive shaft 70 to facilitate driving a blade of the hedge trimmer 10 while the drive shaft 70 rotates. First and second O-rings 86 and 88 are also included in the drive assembly 64. The first O-ring 86 is provided between the drive shaft 70 and the gear 72. The second O-ring 88 is provided between the gear 72 and the bearing cage 78. When the components of the drive assembly 64 are assembled together, a retainer clip 90 is employed in connection with a clip groove 92 to facilitate retaining the bearing cage 78 on the drive shaft 70.

Turning now to FIGS. 8 and 9, the interactions between the stop pin 50, gear box 56, and the drive assembly 64 are shown. FIG. 8 illustrates the stop pin 50 provided through an opening in a top portion of the gear box 56. The anchor 54 is coupled to the gear box 56 via fasteners or the like, thereby compressing the spring mechanism 58. The spring mechanism 58 biases the stop pin 50 downwards, such that the stop pin 50 projects through the second aperture 68 in the recessed portion 60 of the gear box 56 (FIG. 6). Because the annular portion 62 of the drive assembly 64 is positioned within the recessed portion 60 (FIG. 6), the stop pin 50 is able to contact a periphery portion of the annular portion 62 through the second aperture 68. FIG. 9 illustrates the interaction of the stop pin 50 and drive assembly 64 without the gear box 56 shown. As discussed, when the anchor 54 is secured to the gear box 56, the spring mechanism 58 biases the stop pin 50 into engagement with the annular portion 62 of the gear 72, thereby engaging the positive stop 80 of the drive assembly 64.

During operation of the hedge trimmer 10, the throttle trigger 24 operates the cable assembly 32 for engaging and disengaging the stop pin 50 with the positive stop 80 on the drive assembly 64. When the trigger 24 is in a released position, the stop pin 50 is allowed to fully engage into the positive stop 80 on the bearing cage 78 at a top portion of the drive assembly 64, which is located near a bottom portion of the gear box 56. The coiled spring mechanism 58 keeps the stop pin 50 in position. When the stop pin 50 is engaged with the positive stop 80 of the bearing cage 78, the drive shaft 70, roller bearings 74, bearing cage 78, and cutting blade drive bushing 82 are locked together and stopped, while the drive gear 72 is allowed to rotate with the running engine 14. Thus, besides stopping the cutting blade 16 when the stop pin 50 is engaged, the present invention also allows the hedge trimmer 10 to be started at a fast idle speed, without pulling the trigger 24 and with no blade movement. The fast idle speed for starting is accomplished with the use of a unique carburetor.

When the trigger 24 is pulled, on the way to wide open throttle, the attached cable 38 pulls the stop pin 50 out of the positive stop 80 in the bearing cage 78, allowing the roller bearing clutch to engage and lock up the drive gear 72 to the drive shaft 70, thereby driving the cutting blade 16. The first and second O-rings 86 and 88 are employed as a stabilizing feature and for smooth operation.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A braking system for a power tool having an engine with an actuatable variable throttle, the braking system comprising:
    a clutch mechanism provided within a drive assembly, the clutch mechanism comprising:
        a gear with an integral annular portion,
        a cage at least partially inserted into the annular portion, the cage including a radially outward positive stop at a top portion and first slots,
        a drive bushing mating with the cage and including second slots, the second slots corresponding to the first slots, and
        rollers located within spaces created by the first and the second slots, the rollers being in contact with the annular portion and the second slots and unable to escape the slots;
    a stop pin which engages the positive stop of the clutch mechanism to minimize a stopping time of a blade of the power tool,
    wherein the stop pin is biased to engage the clutch mechanism via a coiled return spring and is disengageable from the clutch mechanism via a braking system cable, the braking system cable being coupled to a throttle trigger, activation of the throttle trigger causing actuation of the variable throttle of the power tool and the disengagement of the stop pin from the clutch mechanism; and
    an anchor to secure the braking system cable directly to a gear box.

2. The braking system of claim 1, wherein a throttle cable for actuation of the variable throttle of the power tool is also coupled to the throttle trigger.

3. The braking system of claim 1, wherein the braking system cable has a first end coupled to a throttle trigger and a second end coupled to the stop pin.

4. The braking system of claim 1, wherein the stop pin projects through an aperture in the gear box to engage a positive stop on a top portion of the drive assembly.

5. The braking system of claim 1, wherein a drive shaft of the drive assembly has a counterweight secured thereto.

6. The braking system of claim 1, wherein the power tool is a hedge trimmer.

7. A braking system for a power tool having an engine with an actuatable variable throttle, the braking system comprising:
    a drive assembly including a clutch mechanism, the clutch mechanism comprising:
        a gear with an integral annular portion,
        a cage at least partially inserted into the annular portion, the cage including a radially outward positive stop at a top portion and first slots,
        a drive bushing mating with the cage and including second slots, the second slots corresponding to the first slots, and
        rollers located within spaces created by the first and the second slots, the rollers being in contact with the annular portion and the second slots and unable to escape the slots;
    a stop pin movable between an engaged position and a released position with the positive stop, wherein in the engaged position the stop pin minimizes a blade stopping time of the power tool; and
    a braking system cable coupled to the stop pin and to a throttle trigger of the power tool to move the stop pin between the engaged position and the released position, activation of the throttle trigger causing actuation of the variable throttle of the power tool and movement of the stop pin to the released position.

8. The braking system of claim 7, further comprising a cable housing provided over the braking system cable, the cable housing having a first end and a second end, the first end of the cable housing being secured to an end fitting and the second end of the cable housing being secured to an anchor.

9. The braking system of claim 8, wherein the end fitting is coupled to a handle portion of the power tool and the anchor is fastened to a top portion of a gear box.

10. The braking system of claim 8, further comprising a spring provided over the braking system cable and positioned between the anchor and the stop pin, wherein the spring biases the stop pin towards the drive assembly.

11. The braking system of claim 7, wherein the positive stop comprises two arms projecting radially outwardly from the top portion of the cage at opposing sides of the cage.

12. A braking system for a power tool having an engine with an actuatable variable throttle, the braking system comprising:
    a drive assembly, the drive assembly comprising:
        a clutch mechanism provided within the drive assembly, the clutch mechanism comprising:
            a pear with an integral annular portion,
            a cage at least partially inserted into the annular portion, the cage including a radially outward positive stop at a to portion and first slots,
            a drive bushing mating with the cage and including second slots, the second slots corresponding to the first slots, and
            rollers located within spaces created by the first and the second slots, the rollers being in contact with the annular portion and the second slots and unable to escape the slots;
        a drive shaft passing through and coupled to the clutch mechanism;
        a counterweight secured to a bottom portion of the drive shaft; and
        a stop pin that is movable between an engaged position and a released position with the positive stop, wherein in the engaged position the stop pin stops a cutting blade of the power tool, and further wherein the stop pin is secured to a first end portion of a cable assembly, the cable assembly having a second end portion being coupled to a throttle trigger.

13. The braking system of claim 12, wherein the positive stop comprises two arms projecting radially outwardly from the top portion of the cage at opposing sides.

14. The braking system of claim 12, wherein the stop pin is selectively moved between the engaged position and the released position with the positive stop upon activation of the throttle trigger.

15. A braking system for a power tool having an engine with an actuatable variable throttle, the braking system comprising:
- a clutch mechanism provided within a drive assembly, the clutch mechanism comprising:
  - a gear with an integral annular portion,
  - a cage at least partially inserted into the annular portion, the cage including a radially outward positive stop at a top portion and first slots,
  - a drive bushing mating with the cage and including second slots, the second slots corresponding to the first slots, and
  - rollers located within spaces created by the first and the second slots, the rollers being in contact with the annular portion and the second slots and unable to escape the slots;
- a stop pin which interacts with the clutch mechanism to minimize a stopping time of a blade of the power tool, wherein the stop pin is biased to engage the clutch mechanism via a coiled return spring and is disengageable from the clutch mechanism via a braking system cable, the braking system cable being coupled to a throttle trigger, activation of the throttle trigger causing actuation of the variable throttle of the power tool and the disengagement of the stop pin from the clutch mechanism; and
- a throttle lever to couple the braking system cable and throttle trigger, the throttle lever having a guide slot through which a first end of the braking system cable can travel.

16. The braking system of claim 15, wherein the throttle trigger directs the first end of the braking system cable along the guide slot.

\* \* \* \* \*